(12) United States Patent
Smith et al.

(10) Patent No.: US 10,859,045 B1
(45) Date of Patent: Dec. 8, 2020

(54) INTEGRATED POWER ELECTRONICS AND INTAKE AIR THERMAL MANAGEMENT SYSTEM AND METHOD

(71) Applicant: GM GLOBAL TECHNOLOGY OPERATIONS LLC, Detroit, MI (US)

(72) Inventors: Michael A. Smith, Clarkston, MI (US); Robert Gallon, Northville, MI (US); Richard J. Lopez, Bloomfield, MI (US); Daniel R. Tylutki, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/672,673

(22) Filed: Nov. 4, 2019

(51) Int. Cl.
| | |
|---|---|
| *F02M 31/04* | (2006.01) |
| *F02M 35/16* | (2006.01) |
| *F02M 26/35* | (2016.01) |
| *F01P 5/10* | (2006.01) |
| *F01P 3/18* | (2006.01) |
| *F02M 31/10* | (2006.01) |

(52) U.S. Cl.
CPC ............. *F02M 35/161* (2013.01); *F01P 3/18* (2013.01); *F01P 5/10* (2013.01); *F02M 26/35* (2016.02); *F02M 31/042* (2013.01); *F02M 31/10* (2013.01); *F01P 2060/02* (2013.01)

(58) Field of Classification Search
CPC ...... F02M 35/161; F02M 26/35; F02M 31/04; F02M 31/042; F02M 31/10; F01P 3/18; F01P 5/10; F01P 2060/02
See application file for complete search history.

(56) References Cited

U.S. PATENT DOCUMENTS

| | | | |
|---|---|---|---|
| 9,546,589 B2 | 1/2017 | Young et al. | |
| 2013/0219872 A1 | 8/2013 | Gibble | |
| 2014/0150755 A1* | 6/2014 | Cunningham | ......... F02M 31/10 123/563 |
| 2019/0120118 A1 | 4/2019 | Son | |

* cited by examiner

*Primary Examiner* — Jacob M Amick
(74) *Attorney, Agent, or Firm* — Lorenz & Kopf LLP

(57) ABSTRACT

Systems and methods are provided for avoiding intake air condensation. A thermal management system includes a propulsion system with an internal combustion engine and an electric machine. A power electronics system delivers power to the electric machine. A fluid circuit is configured to cool the power electronics system. Intake air of the internal combustion engine is circulated through an intake air heat exchanger. A controller operates the fluid circuit to collect heat from the power electronics system and to selectively deliver the heat to the intake air heat exchanger.

20 Claims, 4 Drawing Sheets

INTEGRATED POWER ELECTRONICS AND INTAKE AIR THERMAL MANAGEMENT SYSTEM AND METHOD

INTRODUCTION

The present disclosure generally relates to thermal management and in particular, relates to the integration of power electronics with a heat exchanger disposed in an intake air system to manage warming and cooling of the intake air.

A variety of systems process multiple working fluids to accomplish desired results. One application involves internal combustion engines such as those used in automobiles that process intake air and fuel within one or more combustion chambers. Processing of the working fluid within a combustion chamber produces heat and exhaust gas. Heat may be removed from the system by an engine cooling system. Some internal combustion engines may also include a charging system with a compressor configured to increase the pressure of the combustion air delivered to the engine for the combustion process. The compressors operate at high rotational speeds and produce heat which may be removed from the intake air by an intercooler. A variety of applications also include electric machines for propulsion activities. These machines are typically associated with a control system that uses power electronics devices such as in a traction power inverter module.

Under certain operating conditions of the internal combustion engine, water entrained in the intake air may undesirably condense prior to reaching the engine's cylinders. In the presence of subfreezing temperatures and particularly when the engine is in cold conditions where the intake manifold pressure is above ambient pressure. The accumulation of water in either liquid or solid form is undesirable.

Accordingly, it is desirable to provide systems and methods that effectively avoid the accumulation of water in an intake system. Furthermore, other desirable features and characteristics of the present invention will become apparent from the subsequent detailed description and the appended claims, taken in conjunction with the accompanying drawings and the foregoing technical field and introduction.

SUMMARY

Systems and methods are provided for avoiding intake air condensation. In a number of embodiments, a thermal management system includes a propulsion system with an internal combustion engine and an electric machine. A power electronics system delivers power to the electric machine. A fluid circuit is configured to cool the power electronics system. Intake air of the internal combustion engine is circulated through an intake air heat exchanger. A controller operates the fluid circuit to collect heat from the power electronics system and to selectively deliver the heat to the intake air heat exchanger.

In additional embodiments, the controller is configured to calculate a water content limit of the intake air and to estimate a water content of the intake air.

In additional embodiments, the controller is configured to compare the estimated water content to the calculated water content limit to determine whether to warm or cool the intake air.

In additional embodiments, the shutters control air flow over the radiator, and the controller is configured to operate the shutters.

In additional embodiments, a pump and a flow control valve are disposed in the fluid circuit. The controller is configured to operate the pump and the flow control valve in response to water content in the intake air.

In additional embodiments, the controller is configured to initiate a warming mode of operation when the water content in the intake air exceeds a saturation point of the intake air.

In additional embodiments, the controller is configured to initiate a cooling mode of operation when the water content in the intake air is less than a saturation point of the intake air.

In additional embodiments, the controller is configured to estimate water content in the intake air by evaluating an exhaust gas recirculation component of the intake air, a positive crankcase ventilation component of the intake air, a fresh air component of the intake air, and a residual gas fraction component of the intake air.

In additional embodiments, the controller is configured to estimate a target temperature of the intake air and, following delivery of the heat to the intake air heat exchanger, to determine whether the target temperature has been reached.

In additional embodiments, an intake duct delivers the intake air to the internal combustion engine. A compressor is disposed in the intake duct to charge the intake air. The controller is configured to operate the fluid circuit to cool the intake air when the compressor is operating to charge the intake air.

In a number of additional embodiments, a method of controlling a thermal management system includes delivering power, by a power electronics system, to an electric machine of a propulsion system. The power electronics system is cooled by a fluid circuit. Intake air of the internal combustion engine is circulated through an intake air heat exchanger. A controller operates the fluid circuit to collect heat from the power electronics system and to selectively deliver the heat to the intake air heat exchanger.

In additional embodiments, the controller calculates a water content limit of the intake air and estimates a water content of the intake air.

In additional embodiments, the controller compares the estimated water content to the calculated water content limit and determines whether to warm or cool the intake air.

In additional embodiments, shutters operated by the controller control air flow over the radiator.

In additional embodiments, a pump circulates fluid in the fluid circuit and a flow control valve controls flow in the fluid circuit. The controller operates the pump and the flow control valve in response to water content in the intake air.

In additional embodiments, the controller initiates a warming mode of operation when the water content in the intake air exceeds a saturation point of the intake air.

In additional embodiments, the controller initiates a cooling mode of operation when the water content in the intake air is less than a saturation point of the intake air.

In additional embodiments, the controller is configured to estimate water content in the intake air by evaluating an exhaust gas recirculation component of the intake air, a positive crankcase ventilation component of the intake air, a fresh air component of the intake air, and a residual gas fraction component of the intake air.

In additional embodiments, the controller determines a target temperature of the intake air and, following delivery of the heat to the intake air heat exchanger, determines whether the target temperature has been reached.

In a number of other embodiments, a propulsion system includes an internal combustion engine and an electric machine. A power electronics system delivers power to the electric machine. A fluid circuit cools the power electronics system. Intake air of the internal combustion engine is circulated through an intake air heat exchanger. A controller is configured to read inputs from an intake manifold pressure and temperature sensor and from an intake duct pressure sensor. Based on the read inputs, the controller determines a water content limit of the intake air and estimates water content in the intake air by evaluating an exhaust gas recirculation component of the intake air, a positive crankcase ventilation component of the intake air, a fresh air component of the intake air, and a residual gas fraction component of the intake air. The fluid circuit is to cool the intake air when the estimated water content is less than the water content limit and to warm the intake air when the estimated water content is greater than the water content limit.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
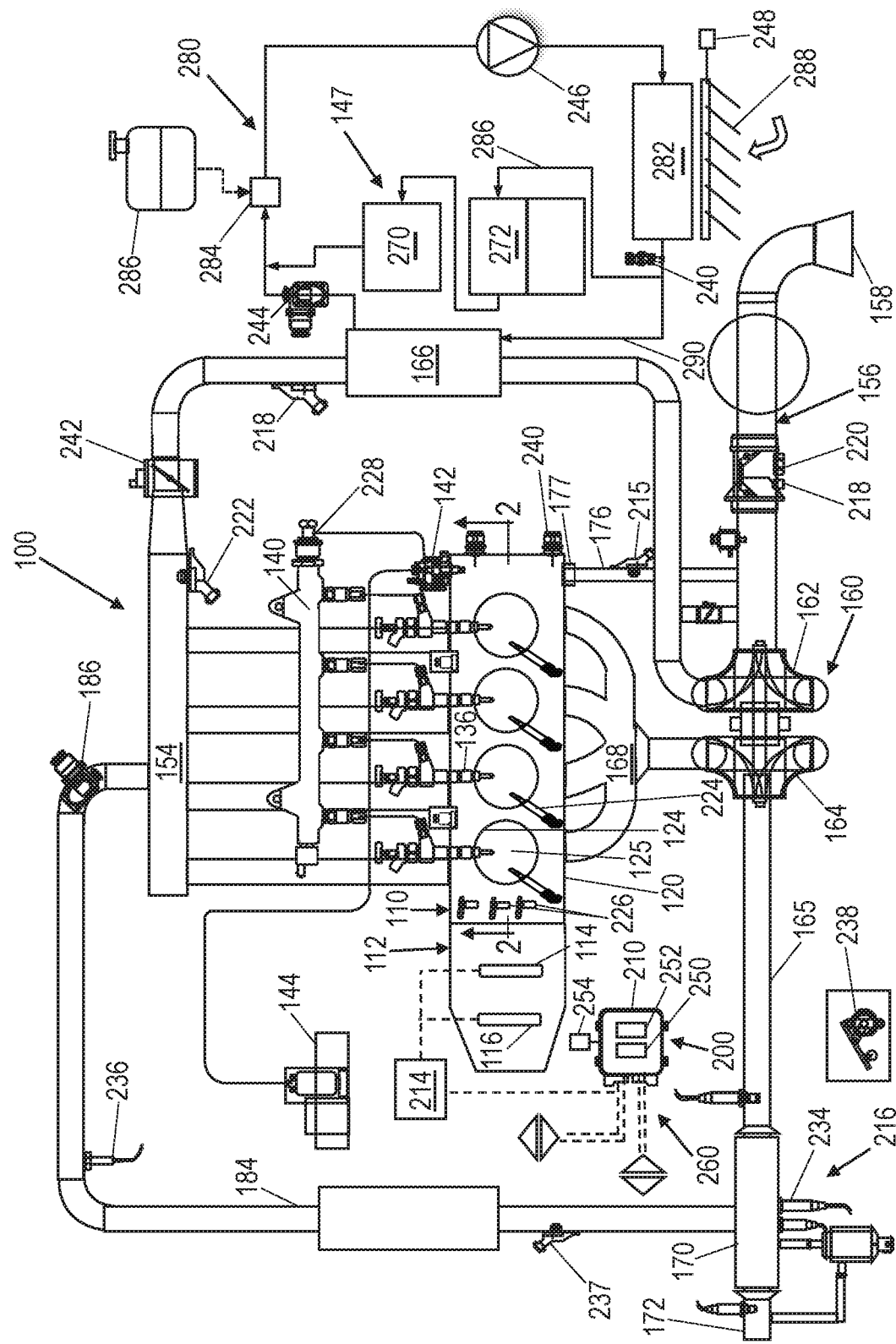
FIG. 1 illustrates a thermal management system associated with a propulsion system with power electronics, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of steering systems, and that the vehicle system described herein is merely one example embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As described herein, disclosed system and method embodiments employ excess heat from an electrical system to warm intake air under certain conditions. A number of embodiments generally include a hybrid propulsion system with an internal combustion engine and an electric machine. A power electronics system is provided for supplying power to the electric machine. A thermal management system includes a number of aspects of the propulsion system and includes a fluid circuit configured to cool the power electronics system. A heat exchanger is configured to cool intake air of the internal combustion engine. A controller is configured to calculate a water content limit of the intake air, to estimate a water content of the intake air and to operate the thermal management system to collect heat from the power electronics system and selectively deliver the heat to the heat exchanger to warm the intake air. Warming the intake air is desirable in certain operating conditions where a risk of condensation from the intake air exists.

Figure 2:
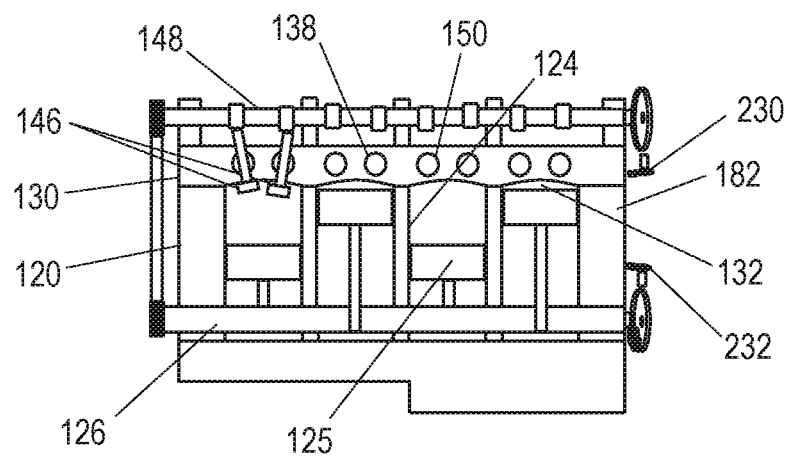
FIG. 2 is the section 2-2 of the internal combustion engine of the system of FIG. 1.

An embodiment may include a propulsion system 100, as shown in FIG. 1 that includes an internal combustion engine 110, also shown in FIG. 2, and an electrified transmission 112 that includes a pair of electric machines configured as motors 114, 116. It will be appreciated that the motors 114, 116 may also operate as generators. In other embodiments, electrification may take another form such as through a separate electric motor or an electric motor integrated with the engine 110. In this embodiment, the engine 110 generally has an engine block 120 defining at least one cylinder 124, each of which has a piston 125 coupled to rotate a crankshaft 126. A cylinder head 130 cooperates with each of the piston(s) 125 to define a combustion chamber 132. A fuel and air mixture (not shown) is delivered into the combustion chamber 132 and ignited, resulting in hot expanding exhaust gasses causing reciprocal movement of the piston(s) 125. The fuel is provided by at least one fuel injector 136 and the air is delivered through at least one intake port 138. The fuel is provided at high pressure to the fuel injector(s) 136 from a fuel rail 140 in fluid communication with a high pressure fuel pump 142 that increase the pressure of the fuel received from a fuel source 144. Each of the cylinders 124 has at least two valves 146, actuated by a camshaft 148 rotating in time with the crankshaft 126. The valves 146 selectively allow air into the combustion chamber 132 from the port 138 and alternately allow exhaust gases to exit through a port 150. In some examples, a cam phaser may selectively vary the timing between the camshaft 148 and the crankshaft 126.

The intake air may be distributed to the air intake port(s) 138 through an intake manifold 154. An air intake duct system 156 delivers air from the ambient environment through an intake 158 for supply to the intake manifold 154. A forced air system such as a charging system 160, having a compressor 162 rotationally coupled to a turbine 164, may be provided. The turbine 164 rotates by receiving exhaust gases from an exhaust manifold 168 that directs exhaust gases from the exhaust ports 150 and through a series of vanes prior to expansion through the turbine 164. The exhaust gases exit the turbine 164, are directed through an exhaust system 165 into an aftertreatment system 170, and exhausted through a tailpipe 172. Rotation of the compressor 162 increases the pressure and temperature of the air in the intake duct system 156 and in the intake manifold 154. An intercooler in the form of a heat exchanger 166 is disposed in the intake duct system 156 and may alternately, as further described below, operate to reduce the temperature of the intake air or to increase the temperature of the intake air.

The current embodiment includes a positive crankcase ventilation (PCV) system 176 coupled between the crankcase 182 and the intake duct system 156. A PCV valve 177 regulates flow through the PCV system 176. An exhaust gas recirculation (EGR) system 184 is coupled between the exhaust system 165 and the intake manifold 154. The EGR system 184 of this embodiment is a low pressure system taking exhaust downstream from the turbine 164. Other embodiments may include a high pressure EGR system (not shown) taking exhaust upstream from the turbine 164 in addition to, or separate from, the low pressure EGR system 184. An EGR valve 186 regulates a flow of exhaust gases in the EGR system 184.

In general, combustion air entering the cylinders 124 is a combination of ambient air entering through the intake 158, exhaust gases recirculated through the EGR system 184, and crankcase gases drawn through the PCV system 176. In addition, a residual gas fraction remains in the intake manifold 154. As a result, air in the intake manifold 154 has a water content that is a combination of contributions from these sources. A part of the water content may originate with each of the ambient air, EGR gases, PCV gases and residual gas. Under certain conditions, such as when the air is saturated, condensation of water may occur within the intake duct system 156 and/or the intake manifold 154. For example, during a cold start of the engine 110, especially in subfreezing ambient temperature conditions, condensation may form. In addition, ice may form from any condensed water. These undesirable results are addressed as described herein by the disclosed systems and methods that advantageously avoid condensation.

The propulsion system 100 also includes a control system 200 that generally includes a controller 210, a power electronics system 147, a battery system 214, and a sensor system 216. The sensor system 216 includes one or more sensing devices that sense observable conditions of the propulsion system 100. In this embodiment, the sensing devices include, but are not limited to, an intake duct pressure sensor 218, a mass airflow and temperature sensor 220, a manifold pressure and temperature (TMAP) sensor 222, a PCV pressure sensor 215, coolant and oil temperature and level sensors 226, a fuel rail pressure sensor 228, a cam position sensor 230, a crank position sensor 232, exhaust pressure sensors 234, an EGR temperature sensor 236, an EGR pressure sensor 237, an accelerator pedal position sensor 238, and a coolant temperature sensor 240. The controller 210 is communicatively coupled with each sensor in the sensor system 216 to receive input signals from the various sensors, which are configured to generate the signals in proportion to various physical parameters associated with the propulsion system 100. Using the various sensed values, the controller 210 may conventionally determine a number of parameters such as residual gas fraction in the intake manifold 154, EGR mass flow rate, PCV mass flow rate, and boost level of the charging system 160 such as indicated by a compression rate of the compressor 162.

In general, the controller 210 may generate output signals for delivery to various controlled devices such as actuators that are arranged to control the operation of a thermal management system 260 and the propulsion system 100, including, but not limited to, the fuel injectors 136, the battery system 214, the motors 114, 116, a throttle body 242, the EGR valve 186, a flow control valve 244, a pump 246 and a shutter actuator 248. Note, dashed lines may be used to indicate communication between the controller 100 and the various sensors and devices, but are generally omitted for clarity.

The controller 210 may comprise any number of electronic control modules and is configured to receive information from various sources including the sensor system 216, process that information, and provide control signals/commands based thereon to effect outcomes such as operation of the thermal management system 260, the propulsion system 100 and related systems, including the power electronics system 147. In the depicted embodiment, the controller 210 includes a processor 250 and a memory device 252, and is coupled with a storage device 254. The processor 250 performs the computation and control functions of the controller 210, and may comprise any type of processor or multiple processors, single integrated circuits such as a microprocessor, or any suitable number of integrated circuit devices and/or circuit boards working in cooperation to accomplish the functions of a processing unit. During operation, the processor 250 executes one or more programs and may use data, each of which may be contained within the storage device 254 and as such, the processor 250 controls the general operation of the controller 210 in executing the processes described herein, such as the processes described further below in connection with FIG. 4.

The memory device 252 may be any type of suitable memory. For example, the memory device 252 may include volatile and nonvolatile storage in read-only memory (ROM), random-access memory (RAM), and keep-alive memory (KAM), for example. KAM may comprise a persistent or non-volatile memory that may be used to store various operating variables while the processor 250 is powered down. The memory device 252 may be implemented using any of a number of known memory devices such as PROMs (programmable read-only memory), EPROMs (erasable PROM), EEPROMs (electrically erasable PROM), flash memory, or any other electric, magnetic, optical, or combination memory devices capable of storing data, some of which represent executable instructions, used by the controller 210. In certain embodiments, the memory device 252 may be located on and/or co-located on the same computer chip as the processor 250. In the depicted embodiment, the memory device 252 may store the above-referenced programs along with one or more stored values of the data such as for short-term data access.

The storage device 254 stores data, such as for long-term data access for use in automatically controlling the propulsion system 100 and its related systems. The storage device 254 may be any suitable type of storage apparatus, including direct access storage devices such as hard disk drives, flash systems, floppy disk drives and optical disk drives. In one exemplary embodiment, the storage device 254 comprises a source from which the memory device 252 receives the programs that execute one or more embodiments of one or more processes of the present disclosure, such as the steps of the process (and any sub-processes thereof) described further below in connection with FIG. 4. In another exemplary embodiment, the programs may be directly stored in and/or otherwise accessed by the memory device 252. The programs represent executable instructions, used by the electronic controller 210 in processing information and in controlling the propulsion system 100 and its systems, including the power electronics system 147 and an integrated thermal management system 260 as further described below. The instructions may include one or more separate programs, each of which comprises an ordered listing of executable instructions for implementing logical functions. The instructions, when executed by the processor 250 support the receipt and processing of signals such as from the various sensors, and the performance of logic, calculations, methods and/or algorithms for automatically controlling the components and systems of the propulsion system 100. The processor 250 may generate control signals for the thermal management system 260, and to automatically control various components and systems of the propulsion system 100, based on the logic, calculations, methods, and/or algorithms. As will be appreciated, the data storage device 254 may be part of the controller 210, separate from the controller 210, part of one or more of the controllers, or part of multiple systems. The memory device 252 and the data storage device 254 work together with the processor 250 to access and use the programs and the data. While the components of the propulsion system 100 are depicted as being part of the same system, it will be appreciated that in certain embodiments, these features may comprise multiple systems. In addition, in various embodiments the propulsion system 100 may comprise all or part of, and/or may be coupled to, various other vehicle devices and systems.

The controller 210 controls operation of the thermal management system 260, including the propulsion system 100, the engine 110, the power electronics system 147, and the motors 114, 116 to deliver the desired operational performance including torque, speed and emission management. In general, the controller 210 uses the available inputs, including those from the sensor system 216 and actuators identified herein, to provide the controller 210 with parameter data to effectively govern various functions. For example, based on data input, the controller 210 precisely calculates and controls delivery of the appropriate air-fuel mixture and exhaust gas recirculation through operation of the fuel injectors 136, the throttle valve 242, the EGR valve 186, the charging system 160, and may control other parameters such as spark timing, where applicable. The controller 210 also controls the power electronics system 147 and the motors 114, 116 to deliver the appropriate amount of torque. Instead of the controller 210, a different type of processor may be used to provide the electronic logic, e.g. an embedded controller, an onboard computer, or any processing module that might be deployed in the application.

In general, the power electronics system 147 includes a traction power inverter module (TPIM) 270 and a rear power inverter module (RPIM) 272. The two motors 114, 116 are supplied with electric power by the TPIM 270 and the RPIM 272, respectively. In some embodiments another number of inverters may be employed. It should be understood that in some embodiments the TPIM 270 and/or the RPIM 272 may be packaged with the transmission 112. The TPIM 270 and the RPIM 272 may each generally include a power board, a DC bus capacitor, EMI filters, control and gate drive boards, sensors and busbar, each of which is not shown. Certain control algorithms for the motors 114, 116 may be programmed into the control boards. In operation, the power electronics system 147 generates heat. In the current embodiment, because the motors 114, 116 are integrated into the transmission 112, the heat is generated during most typical operating conditions of the propulsion system 100.

The thermal management system 260 is configured for heat management including to control the removal of heat generated by the power electronics system 147. The thermal management system 260 operates a fluid circuit 280 including the pump 246, the flow control valve 244 and a heat exchanger in the form of radiator 282. The pump 246 may be a variable speed electric motor driven fluid pump. The flow control valve 244 may be a solenoid operated variable orifice valve. The radiator 282 may be a liquid to air heat exchanger to transfer heat from the fluid in the fluid circuit 280 to ambient air. In some embodiments, the radiator 282 may be a low temperature radiator that operates below the boiling point of a liquid in the fluid circuit 280. The fluid circuit 280 is connected with a surge tank 286 through an air separator 284 to remove air and allow for expansion.

One loop 286 of the fluid circuit 280 generally includes the pump 246, the radiator 282, the RPIM 272 and the TPIM 270. Accordingly, whenever the pump 246 is operating, fluid flows through the RPIM 272 and the TPIM 270 to collect heat and expel heat through the radiator 282. Each of the TPIM 270 and the RPIM 272 have fluid passages through which the fluid in the loop 286 is circulated to collect heat. Air movement over the radiator 282 may be controlled by louvers 288 that may be variably opened and closed by operation of the actuator 248 in response to the controller 210. The temperature sensor 240 provides input for use in controlling the speed of the pump 246, the position of the flow control valve 244 and the position of the louvers 288.

Another loop 290 of the fluid circuit 280 is disposed in parallel with the loop 286 and generally includes the pump 246, the radiator 282, an intercooler referred to as heat exchanger 166, and the flow control valve 244. Accordingly, flow through the loop 290 is effected when both the pump 246 operates and the flow control valve 244 is open. By operating the pump 246, the fluid circuit 280, in particular the loop 286, may be used to cool the power electronics system 147 when the flow control valve 244 is either open or closed. The fluid circuit 280, in particular the loop 290, may be used to cool the air flowing through the intake duct system 156 when the temperature of the intake air is higher than the temperature of the fluid in the fluid circuit 280 and when the pump 246 is operated and the flow control valve 244 is open. The fluid circuit 280 may also be used to warm the air flowing through the intake duct system 156, specifically through a combination of the loops 286, 290, by collecting heat from the power electronics system 147 and circulating the heat through the heat exchanger 166. To maximize heat retention, the louvers 288 may be closed. To maximize heat delivery to the intercooler, the flow control valve 244 is modulated open and may be fully opened. With the pump 246 operating, the fluid circulated through the power electronics system 147 collects heat. The fluid then passes through the radiator 282 where heat is retained by blocking air flow over the radiator 282 by closing the louvers 288. With the flow control valve 244 open, the heat is then delivered through the heat exchanger 166 for transfer to the intake air.

Figure 3:
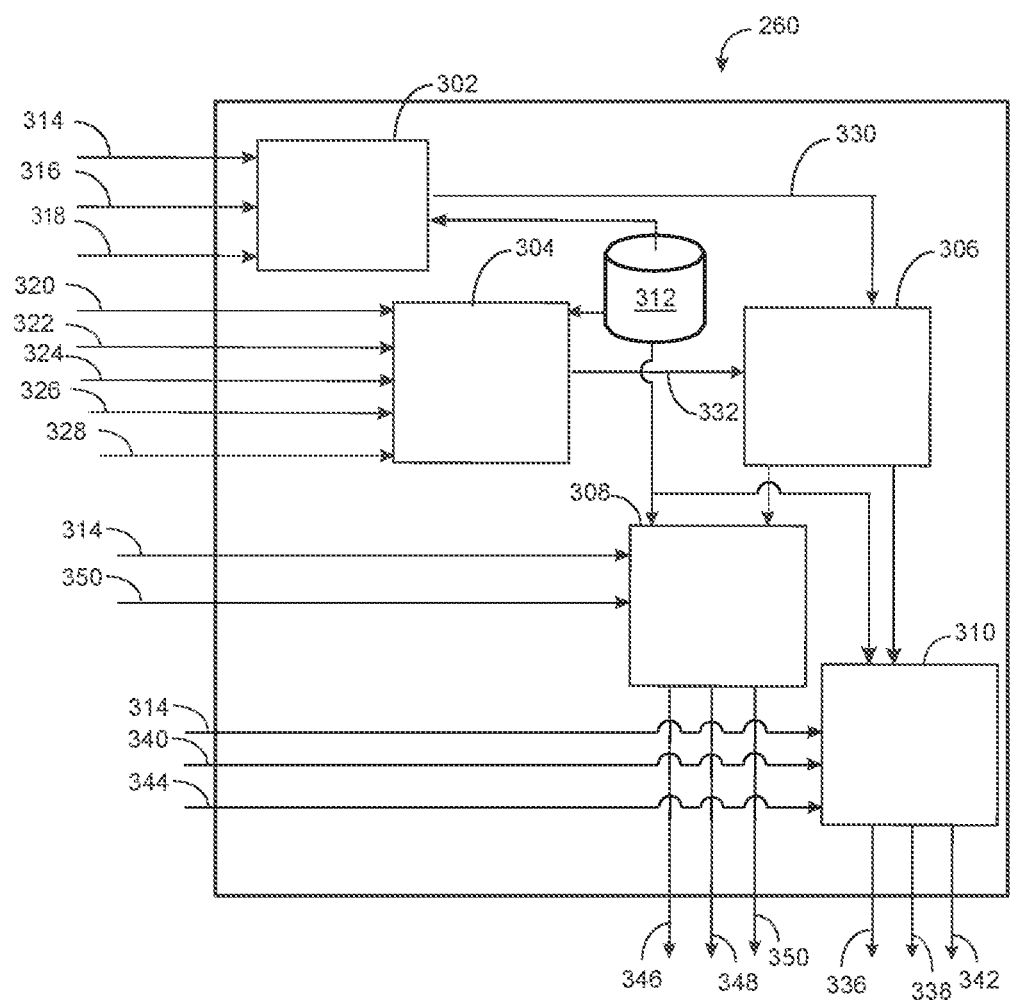
FIG. 3 is a dataflow diagram illustrating control aspects of a thermal management system, in accordance with various embodiments.

Selectively collecting heat from the power electronics system 147 for warming the intake air is beneficial in avoiding condensation in the intake duct system 156 and the intake manifold. Accordingly, the current embodiment in general and through operation of the controller 210, determines when a risk of condensation arises and operates the fluid system 280 to avoid condensation. With reference to FIG. 3, the thermal management system 260 is generally carried out by operation of the controller 210 and may be generally configured to include a water content limit calculation module 302, a water content estimation module 304, a mode determination module 306, a warming control module 308, a cooling control module 310, and a datastore 312.

Figure 4:
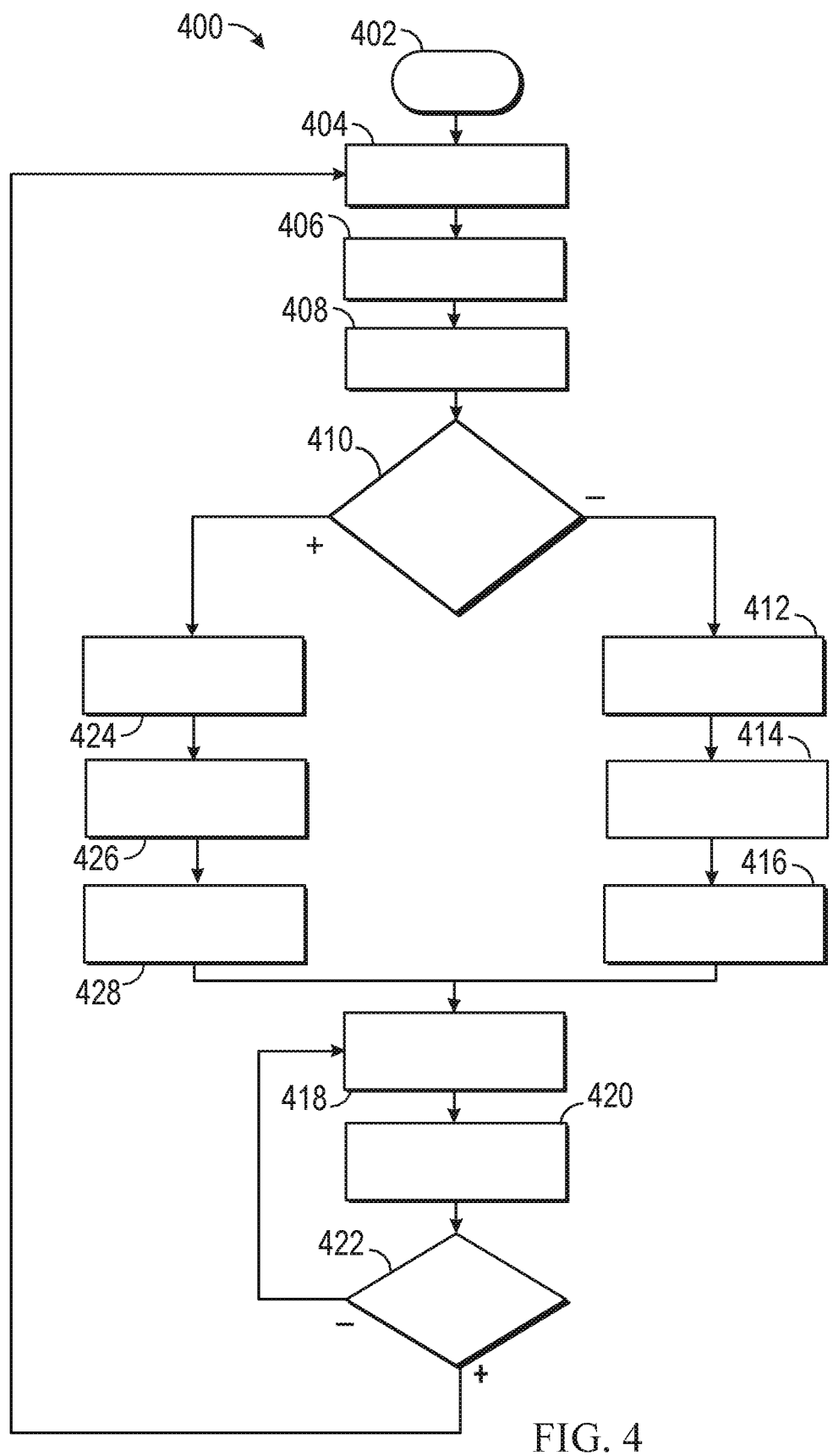
FIG. 4 is a flowchart of methods for controlling the thermal management system, in accordance with various embodiments.

Referring additionally to FIG. 4, along with continued reference to FIGS. 1-3, illustrated in flow chart form is a process 400 such as may be carried out by the thermal management system 260. The process 400 begins 402, such as when operation of the propulsion system 100 starts. The sensor inputs, including those of the sensor system 216 are read 404, along with inputs from other modules of the controller 210. In particular, a signal 314, such as from the manifold pressure and temperature sensor 222, provides input on the temperature of the air in the intake manifold 154 to the water content calculation module 302. A signal 316, such as from the manifold pressure and temperature sensor 222 provides input on the pressure in the intake manifold 154 to the water content limit calculation module 302. A signal 318, such as from the intake duct pressure sensor 218, provides input on pressure in the intake duct system 156 upstream from the throttle body 242 to the water content limit calculation module 302. In addition, a signal 320, such as from a conventional module of the controller 210, provides a PCV mass flow rate estimate to the water content estimation module 304. A signal 322, such as from the mass airflow and temperature sensor 220, provides a fresh air mass flow rate to the water content estimation module 304. A signal 324, such as from the mass airflow and temperature sensor 220, provides an incoming air temperature to the water content estimation module 304. A signal 326, such as from a conventional module of the controller 210, provides an EGR mass flow rate estimate to the water content estimation module 304. A signal 328, such as from a conventional module of the controller 210, provides a residual gas fraction estimate to the water content estimation module 304.

The process 400 proceeds to calculate 406 the water content limit in the intake manifold 154, such as by the water content limit calculation module 302, using the inputs 314, 316 and 318 along with programs and data from the datastore 312. The water content limit is the maximum amount of water the intake air can contain without condensation occurring at the operating temperature and pressure (saturation) and may be calculated using a conventional approach. The calculated water content limit is communicated via a signal 330 to the mode determination module 306. The process 400 proceeds to estimate 408 the water content in the intake air at the intake manifold 154, such as by the water content estimation module 304, using the inputs 320, 322, 324, 326 and 328 along with programs and data from the datastore 312. The water content estimation may be calculated using a conventional approach. The estimated water content 332 is communicated via a signal to the mode determination module 306.

The process 400 determines 410, such as at the mode determination module 306, whether to operate the fluid circuit 280 in a warming mode or in a cooling mode by comparing the water content limit 330 to the estimated water content 332. When the estimated water content 332 is less than the water content limit 330, the determination 410 is negative and process 400 proceeds to initiate, such as by the cooling control module 310, cooling operation 412 of the thermal management system 260 in a cooling mode. In a number of embodiments, cooling operation may be delayed pending an initiation of operation of the charging system 160. When the cooling operation continues, the process 400 opens 414 the shutter 288 such as by operation of the actuator 248 in response to a signal 336 from the cooling control module 310. The process 400 proceeds to modulate 416 the flow control valve 244 such as by a signal 338 from the cooling control module 310. The flow control valve 244 may be partially or fully opened depending on the amount of cooling needed as determined in relation to a boost level signal 340, such as indicated by a compression rate of the compressor 162. When higher compression rate is occurring more cooling is delivered by opening the flow control valve 244 to a greater degree.

The process 400 proceeds to command a pump speed 418 of the pump 246 such as by a signal 342 from the cooling control module 310. The pump speed may be determined using data from the datastore 312 such as may be contained in a lookup table to select a pump speed for the compression rate/boost level signal 340. An estimate 420 is made, such as by the cooling control module 310, for the target temperature to be achieved by the cooling provided by the fluid circuit 280. The estimate may be informed by a signal 344 from another conventional module of the controller 210 that determines the cooling commanded from the heat exchanger 166. The process 400 proceeds to determine 422, such as by the cooling control module 310 whether the target temperature has been reached by comparing the target temperature to the signal 314, such as from the manifold pressure and temperature sensor 222, that provides data on the temperature of the air in the intake manifold 154. When the determination 422 is negative and the target temperature has not been reached, the process 400 returns to command a pump speed 418 to achieve the target temperature. In a number of embodiments, the process 400 may return to modulate 416 the flow control valve prior to commanding a pump speed 418. When the determination 422 is positive and the target temperature has been reached, the process 400 returns to read inputs 404 and proceed therefrom.

Returning to the determine 410 step, such as at the mode determination module 306, the determination is made as to whether to operate the fluid circuit 280 in a warming mode or in a cooling mode by comparing the water content limit 330 to the estimated water content 332. When the estimated water content 332 is greater than or equal to the water content limit 330, the determination 410 is positive and process 400 proceeds to initiate warming operation 424 of the thermal management system 260 in a warming mode, such as by the warming control module 308. In warming operation, the process 400 closes 426 the shutter 288 such as by operation of the actuator 248 in response to a signal 346 initiated by the warming control module 308. The process 400 proceeds to open 428 the flow control valve 244, such as by a signal 348 from the warming control module 308. The flow control valve 244 may be fully opened to warm the intake air as quickly as possible to avoid condensation.

The process 400 proceeds to command a pump speed 418 of the pump 246 such as by a signal 350 from the warming control module 308. The pump speed may be determined using data from the datastore 312 such as may be contained in a lookup table to select a pump speed for the ambient temperature as may be informed by the signal 350 from the mass airflow and temperature sensor 220 of the ambient air temperature. An estimate 420 is made, such as by the warming control module 308, for the target temperature to be achieved by the warming provided by the fluid circuit 280. The estimate may be informed by the signal 350. The process 400 proceeds to determine 422, such as by the warming control module 308 whether the target temperature has been reached by comparing the target temperature to the signal 314, such as from the manifold pressure and temperature sensor 222, that provides data on the temperature of the air in the intake manifold 154. When the determination 422 is negative and the target temperature has not been reached, the process 400 return to command a pump speed

418 to achieve the target temperature. When the determination 422 is positive and the target temperature has been reached, the process 400 returns to read inputs 404 and proceed therefrom. When the propulsion system 100 is shut down, the process 400 ends.

Through the foregoing embodiments, systems and methods avoid the precipitation of condensate in an intake system. Heat from the power electronics of electric motors is selectively delivered to a heat exchanger (charge air cooler) to provide heat to avoid condensation based on a comparison between the water content limit of the intake air and an estimate of the water content of the intake air. The evaluation factors in the contributions of ambient air, PCV gases, EGR gases and residual gas fraction in determining the water content of the intake air at the intake manifold.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A thermal management system comprising:
   a propulsion system including an internal combustion engine and an electric machine;
   a power electronics system from which electric power is delivered to the electric machine;
   a fluid circuit configured to cool the power electronics system;
   an intake air heat exchanger through which intake air of the internal combustion engine is circulated; and
   a controller configured to operate the fluid circuit to collect heat from the power electronics system and to selectively deliver the heat to the intake air heat exchanger.

2. The system of claim 1, wherein the controller is configured to calculate a water content limit of the intake air and to estimate a water content of the intake air.

3. The system of claim 2, wherein the controller is configured to compare the estimated water content to the calculated water content limit to determine whether to warm or cool the intake air.

4. The system of claim 1, comprising shutters disposed to control air flow over the radiator, wherein the controller is configured to operate the shutters.

5. The system of claim 1, comprising:
   a pump in the fluid circuit; and
   a flow control valve in the fluid circuit,
   wherein the controller is configured to operate the pump and the flow control valve in response to water content in the intake air.

6. The system of claim 5, wherein the controller is configured to initiate a warming mode of operation when the water content in the intake air exceeds a saturation point of the intake air.

7. The system of claim 6, wherein the controller is configured to initiate a cooling mode of operation when the water content in the intake air is less than a saturation point of the intake air.

8. The system of claim 1, wherein the controller is configured to estimate water content in the intake air by evaluating an exhaust gas recirculation component of the intake air, a positive crankcase ventilation component of the intake air, a fresh air component of the intake air, and a residual gas fraction component of the intake air.

9. The system of claim 1, wherein the controller is configured to estimate a target temperature of the intake air and to determine whether the target temperature has been reached following delivery of the heat to the intake air heat exchanger.

10. The system of claim 1, comprising:
    an intake duct configured to deliver the intake air to the internal combustion engine; and
    a compressor disposed in the intake duct and configured to charge the intake air,
    wherein the controller is configured to operate the fluid circuit to cool the intake air when the compressor is operating to charge the intake air.

11. A method of controlling a thermal management system of a propulsion system that includes an internal combustion engine and an electric machine, the method comprising:
    delivering power, by a power electronics system, to the electric machine;
    cooling the power electronics system by a fluid circuit;
    circulating intake air of the internal combustion engine through an intake air heat exchanger; and
    operating, by a controller, the fluid circuit to collect heat from the power electronics system and to selectively deliver the heat to the intake air heat exchanger.

12. The method of claim 11, comprising:
    calculating, by the controller, a water content limit of the intake air; and
    estimating, by the controller, a water content of the intake air.

13. The method of claim 12, comprising:
    comparing, by the controller, the estimated water content to the calculated water content limit; and
    determining, based on the comparison, whether to warm or cool the intake air.

14. The method of claim 11, comprising controlling, by shutters operated by the controller, air flow over the radiator.

15. The method of claim 11, comprising:
    circulating, by a pump, fluid in the fluid circuit;
    controlling flow in the fluid circuit by a flow control valve; and
    operating, by the controller, the pump and the flow control valve in response to water content in the intake air.

16. The method of claim 15, comprising initiating, by the controller, a warming mode of operation when the water content in the intake air exceeds a saturation point of the intake air.

17. The method of claim 16, comprising initiating, by the controller, a cooling mode of operation when the water content in the intake air is less than a saturation point of the intake air.

18. The method of claim 11, wherein the controller is configured to estimate water content in the intake air by evaluating an exhaust gas recirculation component of the intake air, a positive crankcase ventilation component of the intake air, a fresh air component of the intake air, and a residual gas fraction component of the intake air.

19. The method of claim 11, comprising:
    estimating, by the controller, a target temperature of the intake air; and determining, by the controller, whether the target temperature has been reached following delivery of the heat to the intake air heat exchanger.

20. A propulsion system, comprising:
an internal combustion engine;
an electric machine;
a power electronics system from which electric power is delivered to the electric machine;
a fluid circuit configured to cool the power electronics system;
an intake air heat exchanger through which intake air of the internal combustion engine is circulated; and
a controller configured to:
  read inputs from an intake manifold pressure and temperature sensor and from an intake duct pressure sensor;
  determine, based on the read inputs, a water content limit of the intake air;
  estimate water content in the intake air by evaluating an exhaust gas recirculation component of the intake air, a positive crankcase ventilation component of the intake air, a fresh air component of the intake air, and a residual gas fraction component of the intake air;
  operate the fluid circuit to cool the intake air when the estimated water content is less than the water content limit; and
  operate the fluid circuit to warm the intake air when the estimated water content is greater than the water content limit.

* * * * *